United States Patent [19]
Joyce et al.

[11] Patent Number: 5,929,002
[45] Date of Patent: Jul. 27, 1999

[54] FLUID LOSS CONTROL

[75] Inventors: Victor Andrew Joyce, Plano, Tex.; Reinaldo Navarrete, Tulsa; Vernon G. Constien, Sperry, both of Okla.

[73] Assignee: Dowell, a division of Schlumberger Technology Corporation, Sugar Land, Tex.

[21] Appl. No.: 08/418,041

[22] Filed: Apr. 6, 1995

Related U.S. Application Data

[63] Continuation-in-part of application No. 08/281,786, Jul. 28, 1994, abandoned.

[51] Int. Cl.$^6$ .......................... E21B 43/26; E21B 43/267; C09K 3/00
[52] U.S. Cl. .......................... 507/211; 507/212; 507/269; 507/922; 507/924; 166/280; 166/283; 166/308
[58] Field of Search .......................... 252/315.3; 166/283, 166/280, 308; 507/211, 212, 269, 922, 924, 209; 405/263

[56] References Cited

U.S. PATENT DOCUMENTS

| | | | |
|---|---|---|---|
| 3,408,296 | 10/1968 | Kuhr et al. ................ | 507/211 |
| 3,601,194 | 8/1971 | Gallus . | |
| 4,289,632 | 9/1981 | Clear ........................ | 507/104 |
| 4,686,052 | 8/1987 | Baranet et al. ........... | 507/244 |
| 4,997,581 | 3/1991 | Williamson et al. .... | 507/212 |
| 5,054,554 | 10/1991 | Pearson . | |
| 5,259,455 | 11/1993 | Nimerick et al. ........ | 166/308 |

OTHER PUBLICATIONS

Rogers, Walter F. *Compositions and Properties of Oil Well Drilling Fluids 3rd ed.,* Houston, Texas: Gulf Publishing Company 1963. pp. 337 and 406.

"Optimized frac pad and gel improve well productivity", by Fritcher, Byrd, and Stegent, *Oil and Gas Journal* (Mar. 20, 1995).

"Dynamic Fluid Loss in Hydraulic Fracturing under Realistic Shear Conditions in High Permeability Rocks", by Navarrete, Cawiezel, and Constien, *SPE 28529,* Paper presented at SPE 69th Annual Technical Conference and Exhibition, New Orleans, La., Sep. 25–28, 1994.

Gray et al "Composition and Properties of Oil Well Drilling Fluids", Gulf Publishing Co. (1980) pp. 579–582.

Rogers, "Composition and Propertries of Oil Well Drilling Fluids"($2^{nd}$ Edition) pp. 281–283.

Encyclopedia of Chemical Technology (Third Edition) vol. 6 (1979) pp. 191, 200, 201.

Encyclopedia of Chemical Technology (Third Edition) vol. 15 (1981) pp. 416–419.

*Primary Examiner*—Shean C. Wu
*Attorney, Agent, or Firm*—John E. Vick, Jr.; Douglas Y'Barbo

[57] ABSTRACT

The invention, in one embodiment, relates to a fluid loss control additive or composition comprising a granular starch composition and fine particulate mica, in specified proportions. The invention further comprises a fracturing fluid containing a starch composition and mica, in a specified ratio. In yet a third embodiment, the invention comprises a method of fracturing a subterranean formation penetrated by a borehole, comprising injecting into the borehole and into contact with the formation, at a rate and pressure sufficient to fracture the formation, a fracturing fluid containing starch and mica, in specified ratios, and in an amount sufficient to provide fluid loss control. In an additional embodiment, a fluid loss additive is used in a low viscosity preliminary sacrificial conditioning stage solution which will condition high permeability formations to provide a substantially uniform, low permeability fracture face leading to longer fracture lengths and more predictable design and execution of fracturing treatments in high permeability formations.

38 Claims, No Drawings

FLUID LOSS CONTROL

REFERENCE TO RELATED APPLICATIONS

This application is a continuation-in-part of co-pending application Ser. No. 281,786 filed on Jul. 28, 1994 now abandoned.

FIELD OF THE INVENTION

This invention relates to the recovery of hydrocarbon fluids from subterranean formations. More particularly, the invention relates to a novel fluid loss control additive combination for use in fracturing fluids, to a novel fracturing fluid containing such additive combination, and to fracturing processes utilizing the novel fracturing fluid.

BACKGROUND OF THE INVENTION

In the recovery of hydrocarbon values from subterranean formations, it has been common practice, particularly in formations of low permeability, to fracture the hydrocarbon-bearing formation to provide flow channels to facilitate production of the hydrocarbons to the wellbore. In such fracturing operations, a fracturing fluid is hydraulically injected down a well penetrating the subterranean formation and is forced against the formation by pressure. Through this procedure, the formation is forced to crack or fracture, and a proppant is placed in the fracture. The fracture provides a radially oriented, relatively high permeability channel in the formation offering improved flow of the recoverable fluid, i.e., oil, gas, or water, back into the wellbore. While a wide variety of fracturing fluids have been used, fracturing fluids customarily comprise a thickned or gelled aqueous carrier fluid which has suspended therein "proppant" particles which are substantially insoluble in the carrier fluid and the fluids of the formation. Proppant particles carried by the fracturing fluid remain in the fracture created, thus propping open the fracture when the fracturing pressure is released and the well is put into production. Suitable proppant materials include, but are not limited to, sand, walnut shells, sintered bauxite, or similar materials. As will be understood by those skilled in the art, the "propped" fracture provides a larger, more highly permeable flow channel to the wellbore through which an increased quantity of hydrocarbons can flow, thereby increasing the production rate of a well.

A problem common to many hydraulic fracturing operations is the loss of fracturing fluid into the porous matrix of the formation, particularly in formations of high permeability, e.g., formations having a permeability of greater than 2 md. Fracturing fluid loss is objectionable, not only because of cost considerations, but especially because it limits the fracture geometry which can be created in high permeability formations. In general, fracturing fluid loss depends on the properties of the rock in the formation, the properties of the fracturing fluid, the shear rate in the fracture, and the pressure difference between the fluid injected and the pore pressure of the rock matrix. In this regard, the properties of the fracturing fluid are those exhibited by the fluid in the formation as influenced, inter alia, by the temperature and shear history to which the fluid has been subjected in its travel down the wellbore and through the fracture.

Thorough analysis of the problem of fracturing fluid loss in high permeability formations reveals that it is necessary to reduce "spurt". As used herein, the term "spurt" refers generally to the volume of fluid lost during fracturing because of early leak off of fracturing fluid before pores of the formation can be plugged, and/or before an external filtercake is formed on the newly exposed rock surface. In the past, a variety of additives to the fluid have been employed, most being selected or designed to generate an external low-permeability filtercake quickly, under little or no shear stress (usually referred to as static conditions) in order to cover the pores and stop spurt. This approach is unsatisfactory since high shear stresses eliminate or severely limit the formation of external filtercake.

In general, the higher the permeability of a rock, the greater the fluid losses due to spurt are likely to be. However, it has been determined that during hydraulic fracturing, spurt occurs principally at or near the advancing tip of the fracture, where new rock surface is being generated. The shear stresses that the fracturing fluid exerts on the surface of the rock are greater proximate the tip of the fracture because of the narrower fracture gap in that location. As indicated previously, the high shear stresses prevent the formation of external filtercakes of polymer and/or fluid loss additives by eroding the surface of the cake in contact with the fracturing fluid. Accordingly, to be effective, a fluid loss additive must be able to stop spurt under high shear rates.

In fracturing high permeability formations, it is desired to develop fractures which are wide and high but which do not extend the great radial distance away from the wellbore as is common in the fracturing of relatively low permeability formations. In the design of high permeability formation fracturing, it is desirable to achieve a condition called tip screen-out after the fracture has opened the desired, relatively short, radial distance from the wellbore. Tip screen outs are achieved by allowing leakoff of the fracturing fluid into the formation to the point where there is insufficient fluid to suspend the associated proppant which the fluid is carrying. In order to accurately design such treatments for high permeability formations (greater than 50 milidarcies), it has been necessary to know the precise permeability of the formation so that tip screen out will occur at the desired point in the pumping schedule. If the formation permeability is not known or is only estimated by calculating the permeability of adjacent wells or similar formations, any variation in the actual permeability of the formation being treated will cause the fracturing treatment to deviate from that designed since the desired tip screen out may occur too early, too late or not at all, therefore not returning full value for the treatment performed. It would, thus, be desirable to be able to more accurately predict the formation permeability in high permeability formations or to temporarily alter the formation permeability to an accurately predictable value prior to or during the fracturing treatment so that the fracturing treatment can be executed in accordance with the desired design. The present invention addresses this desirable result.

Williamson et al., (U.S. Pat. No. 4,997,581) describe the prior art utilization of a variety of inorganic solids, natural starches, and combinations of finely divided inorganic solids with natural starches. All of these compositions are deemed by these patentees to be insufficient to control fracturing fluid loss in moderate to high permeability formations. While these patentees attempt to provide an effective additive by the use of blends of natural starches and modified starches, their blends have limited application. For example, for formations having high permeability and high temperatures, e.g., 300° F., natural and modified starches may not effectively plug the pores in the fracture walls. Finally, additives suggested by other workers in the art, while providing some fluid loss control, often are prohibitive in cost.

Accordingly, there has existed a need for a low cost additive or fracturing fluid which provides fracturing fluid loss control, and a method of fracturing a subterranean formation characterized by reduced fluid loss, under a variety of conditions which include high permeability, high shear rates and high temperature. The invention answers this need.

SUMMARY OF THE INVENTION

The present invention provides a relatively low cost, highly effective fluid loss additive which is capable of being used under widely varying conditions of bottom hole temperature, pressure and formation permeability and to achieve the desired predictable tip screen outs in formations of high but not accurately known permeability.

In accordance with the invention, one embodiment relates to a fluid loss control additive or composition comprising a granular starch composition and fine particulate mica combined in a specified ratio or proportion. Preferably, the fluid loss control composition of the invention contains an additional finely divided inorganic solid, or mixture of such solids. The additive components of the invention may be added directly to a suitable fracturing fluid, or, for ease of formulation, the additive components of the invention may be suspended in a suitable diluent or carrier liquid, the fluid loss control additive-carrier liquid combination then being combined with the fracturing fluid.

Further in accordance with the invention, a fracturing fluid comprises a granular starch composition and fine particulate mica, in a specified ratio, and preferably contains the additional inorganic solid(s) mentioned, these components being supplied in the fracturing fluid in amount and proportion sufficient to provide fluid loss control.

Still further in accordance with the invention, a method of fracturing a subterranean formation penetrated by a borehole comprises injecting into the borehole and into contact with the formation, at a rate and pressure sufficient to fracture the formation, a fracturing fluid composition containing a granular starch composition and finely divided mica combined in a ratio specified more fully hereinafter and in an amount sufficient to provide fracturing fluid loss control. Preferably, the fracturing fluid used also contains a finely divided inorganic solid or solids.

Still further in accordance with the invention, a method of fracturing a high permeability formation comprises providing a low-viscosity, sacrificial fracturing fluid containing a relatively large amount of fluid loss additive and pumping this sacrificial fracturing fluid at fracturing pressure into a subterranean formation to close off formation pores and provide a relatively uniform, low and predictable permeability to the otherwise high permeability formation prior to pumping fracturing fluid pad and proppant carrying stages at fracture-extending pressure.

Still further in accordance with the invention, the above low-viscosity sacrificial fracturing fluid includes a fluid loss additive comprising a granular starch composition and finely divided mica combined in a ratio specified more fully hereinafter and in an amount sufficient to provide fracturing fluid loss control and predictable resultant permeability to the formation. Preferably, the sacrificial fracturing fluid used also contains a finely divided inorganic solid or solids.

It is therefore an object of this invention to provide a fracturing fluid and a fluid loss additive composition which is of relatively low cost.

It is another object of this invention to provide a fracturing fluid and a fluid loss additive which may be used in a wide variety of formation conditions of temperature and permeability.

It is a further object of this invention to provide a low viscosity, sacrificial fracturing fluid which can be pumped prior to the pumping of typical fracturing fluid stages and which results in the temporary plugging of high permeability formation pores to achieve a relatively uniform, predictable and reproducible apparent permeability which allows more precise execution of tip screen out fracture designs for such high permeability formations.

DETAILED DESCRIPTION OF THE INVENTION

Any suitable granular starch or mixture of starches may be used in the invention. Accordingly, as used hereinafter, the term "starch composition" is understood to include one or more natural starches, one or more chemically modified starches, and mixtures of one or more natural and/or chemically modified starches. Natural starches which may be employed in the invention include, but are not limited to, those of potato, wheat, tapioca, rice, and corn, the preferred starch being potato starch.

Most preferably, pre-gelatinized starches, particularly pre-gelatinized potato starch, are employed. Pre-gelatinized starches may be obtained commercially or they may be prepared by pre-gelatinization treatment. For pre-gelatinization, the chosen starch granules are heated in water to a point where the starch granules swell irreversibly. Upon cooling, this swollen structure is retained. The use of pre-gelatinized starches yields an important advantage to the combination of the invention, since these materials are stable at higher temperatures in the formation, e.g., up to 300° F.

Chemically modified starches are those derived from natural starches by chemical reaction of a natural starch with a suitable organic reactant. Chemically modified starches which may be used in the invention include, but are not limited to, carboxymethyl starch, hydroxyethyl starch, hydroxypropyl starch, acetate starch, sulfamate starch, phosphate starch, nitrogen modified starch, starch crosslinked with aldehydes, epichlorohydrin, borates, and phosphates, and starches grafted with acrylonitrile, acrylamide, acrylic acid, methacrylic acid, maleic anhydride, or styrene. Preferred among the modified starches are hydroxypropyl and carboxymethyl starches. While granule size of any of the above starch particles is not critical, commercially available sizes being suitable, a preferred range of dry particle sizes would be from about 5 $\mu$m to about 150 $\mu$m.

The particulate mica employed in the invention is a matter of choice. As used herein, the term "mica" refers generally to natural and synthetic silicate compositions of varying chemical composition characterized by being cleavable into thin sheets or plates that are flexible and elastic. Suitable micas include muscovite, phlogophite, biotite, zinnwadite, and pegmatite. As indicated, fine particulate mica is required. Preferably, the median particle size of the mica is smaller than about 50 $\mu$m, most preferably below 32 $\mu$m.

If an additional inorganic solid or solids (i.e., additional and different from mica) are employed along with the primary components, the median particle size thereof will also be, as indicated, suitably small, generally in the same range as the mica particles, and preferably the median particle size will be below about 50 $\mu$m. Preferred finely divided inorganic solids include those of silica, limestone ($CaCO_3$), rock salt, alumina, talc, and kaolin.

The ratio of starch composition to mica, by weight, will range from about 11:1 to about 1:14, preferably from about 5:1 to about 1:7. If additional finely divided inorganic solid or solids are employed, the inorganic solid(s) may replace some starch or mica in the overall solids content of the compositions. The finely divided inorganic solid(s) will preferably have a weight ratio of such solid (or solids) to the mica of from about 1:1 to about 5:1, the weight ratio of the finely divided solids to the starch composition thus being from about 7:1 to about 7:3.

While not wishing to be bound by any theory of invention, it is believed that the somewhat deformable starch particles will partially fill pore throats in the formation, the mica particles, which are platelets, filling the remainder of the throats or voids. It also appears that mica particles are particularly effective in stopping spurt under high shear rate conditions because plate-like particles appear to spend most of their rotation period aligning with the flow in a shear flow which is parallel to the fracture surface. Mica particles having the highest aspect ratio, that is the ratio of the largest dimension (diameter) over the smallest dimension (thickness), apparently align with the flow. This allows the mica particles to sit on the pore throats of the fracture surface thereby covering them more effectively. Also, once the mica particles are on the fracture face, the torque exerted on the mica particles by the shear stress of the flowing fluid is smaller than that experienced by granular-shaped particles of the same diameter under similar high-shear conditions. The mica platelets, thus, appear to be more difficult to remove from the surface and thereby offer better fluid loss properties.

The invention thus provides a bimodal pore filling mechanism characterized by a deformable particle having improved resistance to a high shear fracture fluid, along with small particles which can aid in sealing the pores. In this sense, the ratios of mica to starch mentioned are critical since, at ratios of mica to starch significantly below those designated, the voids in the fracture faces cannot be fully sealed, and, at insufficient ratios of starch to mica, the sealing of the larger pore throats may not be achieved. The additional finely divided inorganic solids, when employed, will be used primarily in very high permeability formations, e.g., greater than about 50 md, where they are beneficial because of their rigidity.

Optionally, but preferably, the starch composition-mica mixture is combined with a surfactant to aid dispersion of the dry starch-mica mixture into the fracturing fluid. Useful surfactants include lower HLB (lipophilic) surfactants in the HLB range of about 1–11, with the HLB range of 4–10 being preferred. Representative useful surfactants include sorbitan monooleate, polyoxyethylene sorbitan monooleate, ethoxylated butanol, and ethoxylated nonyl phenol, as well as various blends of these surfactants. The surfactants typically will be used at a level of about 0.1 to 10 percent by weight, and preferably about 0.5 to 5 percent by weight.

In practice, the additive components of the invention are normally dispersed, with the aid of the surfactant, into a suitable diluent or carrier fluid. Suitable carrier fluids include low toxicity mineral oil, diesel fuel, kerosene, and mixtures thereof. Preferably, the carrier and additive components will be combined in such manner that the starch will be present in an amount of from about 2 percent to about 45 percent by weight, the mica being present in an amount of from about 8 percent to about 25 percent by weight, all percentages based on the total weight of the carrier and components. If additional inorganic solid(s) are present, they will be present in an amount of from about 8 percent to about 25 percent by weight, all percentages again based on the total weight of the carrier and components. The combination additive composition plus carrier is then easily mixed with or dispersed into a fracturing fluid.

The particular fracturing fluid employed with the additive components of the invention is largely a matter of choice and forms no part of the present invention. For example, fluids may comprise micellar solutions or emulsions, uncrosslinked solutions of cellulose or guar, or may be borate, titanium, or zirconium crosslinked fluids, the particular fluid chosen being determined by such considerations as formation temperature and concentration of proppant to be carried. As those skilled in the art will be aware, however, the fracturing fluid and additive compositions must be compatible in the sense that they do not react with one another or otherwise deleteriously interfere with the designed functions of each. Preferably, the additive compositions of the invention are employed with aqueous based fracturing fluids, although this is not a requirement. Particularly preferred are the types of fracturing fluids described by Nimerick, Crowe, McConnell, and Ainley in U.S. Pat. No. 5,259,455, and those disclosed in U.S. Pat. No. 4,686,052.

As noted, the amount of additive components supplied in the fracturing fluid will be that amount sufficient or effective to provide the desired fluid loss control. This concentration of additive will be varied depending on the permeability and other characteristics of the particular formation. Typically, from about 10 to 75 lbs of the additive components of the invention per 1000 gallons fracturing fluid are dispersed in the fracturing fluid, with about 20 to 60 lbs of the additive components per 1000 gallons of fracturing fluid representing a preferred range of addition. As indicated, the concentrations of each of the additive components in the fracturing fluid and the ratios therefore are important if effective sealing of the pores is to be obtained. In general, the fracturing fluid will contain from about 2 lbs. to about 28 lbs. of starch composition and from about 2.5 lbs. to about 28 lbs. of mica, per 1000 gallons of the fracturing fluid. If an additional inorganic solid or solids are employed, the concentration of such solid(s) will range from about 4.0 lbs. to about 15.0 lbs. per 1000 gallons of fracturing fluid, preferably from about 5.0 lbs. to about 10.0 lbs. per 1000 gallons.

Following the practice of the invention, as the fracture is created in the formation, the fluid loss control additive is deposited in the pores in the walls of the fracture to form a seal which controls the leak-off rate and confines the fracturing fluid to the fracture. Therefore, with the same fluid volume, a longer fracture may be obtained. Again, contrary to what might be expected, experiments indicate that use of lower viscosity fracturing fluids containing the additive components of the invention gives better fluid loss control than when more viscous fluids are employed. This appears to be explained by the fact that the ability of a particle to reach the porous fracture face depends on a drag force that the fluid moving toward the fracture face exerts on the particle. This drag force is proportional to the leak off rate before the particles reach the fracture face, which increases with decreasing viscosity of the fluid and increasing rock permeability. This feature is used to particular advantage in a pre-fracturing fluid sacrificial fluid stage of a fracturing method which will be more fully described and illustrated by examples presented hereinafter.

In order to determine the fluid loss control properties of compositions according to the invention, the following experiments were conducted. The experiments were carried out in dynamic fluid loss cells which were modifications of the unit describe by Roodhart, L. P., SPEJ, (October 1985), pp. 629–636. In the modified cells, dynamic fluid loss measurements were made while the test fluid flowed in slot geometry, a circular area in only one of the slot walls being porous. In each case, the surface area (4.97 cm$^2$)and the length (2.54 cm) of the core employed were the same. The width of the slot was the same as the diameter of the core. The variables for each run were thus temperature, pressure, core type and permeability, and shear rate.

In the experiments, aqueous fracturing fluids of the guar containing type were prepared containing starch composition and mica, or starch, mica, and silica flour, in the proportions hereinafter indicated. The starch, mica, and silica, if present, were first slurried with a small quantity of diesel No. 2, organophilic clay, and surfactant, for ease of dispersion in the fracturing fluid. Each fracturing fluid contained typical additives commonly present in such fluids, such as antifoam, bactericide, friction reducer, and delay agent. In the tables of results for each experiment, to demonstrate the importance of the additive components of the invention, comparisons are made, however, only with runs of identical or analogous fracturing fluid not containing the additive components, under the same or substantially similar test conditions, the only significant differences for the "control" runs being the absence of the organophilic clay and surfactant, and somewhat lower content of Diesel No. 2.

In all cases, the shear rate was varied, as follows:

Between 0 sec. to 43 sec. - - - $380s^{-1}$
Between 43 sec. to 6 min. - - - $304s^{-1}$
Between 6 min. to 16 min. - - - $190s^{-1}$
Between 16 min. to 26 min. - - - $133s^{-1}$
Between 26 min. to 45 min. - - - $114s^{-1}$ The results of the experiments, with relevant variables, are as follows:

I

In these runs, a Berea sandstone core having a specific permeability of 1.90 was employed, and the temperature was 150° F. Column A lists the components of the "control" fracturing fluid composition, while Column B lists those of the invention.

| A | | B | |
|---|---|---|---|
| Name | Concentration | Name | Concentration |
| Guar | 25.000 lb/1000 gal. | Guar | 25.000 lb/1000 gal. |
| KCl | 167.000 lb/1000 gal. | KCl | 167.000 lb/1000 gal. |
| Antifoam | 0.250 gal/1000 gal. | Antifoam | 0.250 gal/1000 gal. |
| Bactericide | 0.500 gal/1000 gal. | Bactericide | 0.500 gal/1000 gal. |
| Friction Reducer | 1.000 gal/1000 gal. | Friction Reducer | 1.000 gal/1000 gal. |
| Boric Acid | 5.000 lb/1000 gal. | Boric Acid | 5.000 lb/1000 gal. |
| Caustic Soda | 10.000 lb/1000 gal. | Caustic Soda | 10.000 lb/1000 gal. |
| Delay Agent | 20.00 lb/1000 gal. | Delay Agent | 20.00 lb/1000 gal. |
| Diesel No. 2 | 4.400 lb/1000 gal. | Diesel No. 2 | 7.85 lb/1000 gal. |
| | | Potato Starch | 25.000 lb/1000 gal. |
| | | Mica | 5.000 lb/1000 gal. |
| | | Clay | 0.54 lb/1000 gal. |
| | | Surfactant | 0.150 lb/1000 gal. |

Fluid loss amounts (total), in milliliters, after the times indicated, were as follows:

| A | | B | |
|---|---|---|---|
| minutes | ml. | minutes | ml. |
| 0.0 | 0 | 0.0 | 0 |
| 0.9 | 1.3 | 0.9 | 1.1 |
| 1.5 | 1.5 | 1.5 | 1.2 |
| 9.1 | 3.3 | 9.1 | 2.8 |
| 30.1 | 5.4 | 30.1 | 4.6 |

Accordingly, at relatively low specific permeability, the invention composition exhibits improved fluid loss control.

II

In this set, the Berea sandstone "control" core had a specific permeability of 2.08, while the core used with the composition of the invention had a specific permeability of 2.03. The temperature employed was 250° F., and the amount of guar was increased to 30 lbs/1000 gallons. All other parameters were the same as Run I.

Fluid loss amounts (total), in milliliters, were, as follows:

| A | | B | |
|---|---|---|---|
| minutes | ml. | minutes | ml. |
| 0.0 | 0 | 0.0 | 0 |
| 0.9 | 1.0 | 0.9 | 0.5 |
| 1.5 | 1.2 | 1.5 | 0.9 |
| 9.1 | 3.3 | 9.2 | 2.5 |
| 30.2 | 6.1 | 30.1 | 4.6 |

III

In this run, the Berea sandstone "control" core had a specific permeability of 9.85, while the core used with the composition of the invention had a specific permeability of 10.11. All other parameters were the same as Run I. Fluid loss amounts (total), in milliliters, were, as follows:

| A | | B | |
|---|---|---|---|
| minutes | ml. | minutes | ml. |
| 0.0 | 0 | 0.0 | 0 |
| 0.9 | 2.3 | 0.9 | 1.2 |
| 1.5 | 2.3 | 1.5 | 1.1 |
| 9.1 | 3.7 | 9.2 | 2.3 |
| 30.1 | 5.5 | 30.1 | 4.5 |

IV

The variables of this set correspond to those of run II, except that the Berea sandstone "control" core had a specific permeability of 45.86 and the core used with the composition of the invention had a specific permeability of 49.28. Fluid loss amounts (total), in milliliters, were, as follows:

| A | | B | |
|---|---|---|---|
| minutes | ml. | minutes | ml. |
| 0.0 | 0 | 0.0 | 0 |
| 0.9 | 1.9 | 0.9 | 1.1 |
| 1.5 | 2.3 | 1.5 | 1.3 |
| 9.1 | 4.6 | 9.2 | 3.1 |
| 30.2 | 7.6 | 30.1 | 5.7 |

V

In these runs, the "control" core was a Berea sandstone having a specific permeability of 200.42, the core used with the composition of the invention had a specific permeability of 199.60, and temperature was 150° F. Column A sets forth the base fracturing fluid composition "control" while Column B defines the invention fluid.

| A | | B | |
|---|---|---|---|
| Name | Concentration | Name | Concentration |
| Guar | 25.000 lb/1000 gal. | Guar | 25.000 lb/1000 gal. |
| KCl | 167.000 lb/1000 gal. | KCl | 167.000 lb/1000 gal. |
| Antifoam | 0.250 gal/1000 gal. | Antifoam | 0.250 gal/1000 gal. |
| Bactericide | 0.500 gal/1000 gal. | Bactericide | 0.500 gal/1000 gal. |
| Friction Reducer | 1.000 gal/1000 gal. | Friction Reducer | 1.000 gal/1000 gal. |
| Boric Acid | 5.000 lb/1000 gal. | Boric Acid | 5.000 lb/1000 gal. |
| Caustic Soda | 10.000 lb/1000 gal. | Caustic Soda | 10.000 lb/1000 gal. |
| Delay Agent | 20.00 lb/1000 gal. | Delay Agent | 20.00 lb/1000 gal. |
| Diesel No. 2 | 4.400 lb/1000 gal. | Diesel No. 2 | 7.850 lb/1000 gal. |
| | | Potato Starch | 2.000 lb/1000 gal. |
| | | Silica | 14.000 lb/1000 gal. |
| | | Mica | 14.000 lb/1000 gal. |
| | | Clay | 0.600 lb/1000 gal. |
| | | Surfactant | 0.150 lb/1000 gal. |

Fluid loss amounts (total), in milliliters, after the times indicated, were as follows:

| A | | B | |
|---|---|---|---|
| minutes | ml. | minutes | ml. |
| 0.0 | 0 | 0.0 | 0 |
| 0.9 | 7.8 | 0.9 | 2.8 |
| 1.5 | 8.1 | 1.5 | 3.0 |
| 9.2 | 9.4 | 9.1 | 4.2 |
| 30.1 | 11.7 | 30.2 | 5.6 |

VI

In this run, the Berea sandstone "control" core had a specific permeability of 407.13, while the core used with the composition of the invention had a specific permeability of 404.93. All other parameters were the same as Run V. Fluid loss amounts (total), in milliliters, were, as follows:

| A | | B | |
|---|---|---|---|
| minutes | ml. | minutes | ml. |
| 0.0 | 0 | 0.0 | 0 |
| 0.9 | 37.0 | 0.9 | 7.8 |
| 1.5 | 39.0 | 1.5 | 8.0 |
| 9.2 | 39.8 | 9.1 | 8.8 |
| 30.1 | 40.6 | 30.2 | 9.8 |

In sum, the tests indicate good fluid loss control capability at high shear rates and across a wide spectrum of specific permeability and temperature.

Fluid loss in the fracturing of high permeability (greater than about 50 md) formations may also be addressed, in accordance with another aspect of this invention, through the use of a preliminary sacrificial conditioning stage prior to the pumping of the fracturing treatment. In this regard, a fluid loss additive is suspended in a relatively low viscosity fluid for example, having a viscosity less than 150 centipoise at 510 $sec^{-1}$, and pumped into the high permeability formation at fracturing pressures prior to pumping the "normal" pad fluid of a fracturing treatment. As the fracture is created and is advancing radially outwardly from the borehole, there is a large amount of fluid leak off that occurs from the sacrificial conditioning fluid. This leak off, in turn, causes the fluid loss additive suspended therein to be quickly and easily deposited in the pores on the newly exposed fracture faces of the high permeability formation. The fluid leak off is quickly arrested by the deposit of the fluid loss additive thereby retaining the high pressures necessary to extend the fracture and also to present a "conditioned" face of known, low permeability to the following stages of the fracturing treatment. The creation of the conditioned, known, low permeability fracture face allow the treatment designer to accurately predict when the desired tip screen out will occur so that the treatment can be optimized for proper fracture geometry and proper use and placement of the desired amount of fracturing fluid and proppant.

In accordance with the invention, a low viscosity carrier fluid for the fluid loss additive is provided. Any low viscosity fluid can be used so long as it will suspend the required amounts of fluid loss additive, but a linear or crosslinked guar or cellulose gel utilizing 10 to 20 pounds of gel per one thousands gallons of carrier fluid are preferred for their ease of mixing, ready availability and low cost. While the starch and mica fluid loss additive of the invention is the preferred fluid loss additive in this preliminary sacrificial conditioning fluid, many other fluid loss additives can be used in this process in accordance with the invention. Thus, fluid loss additives comprising silica flour, mica, natural and synthetic hydrocarbon resins and starches such as natural, pregelatinized, modified, and the like and combinations thereof may be used in accordance with the invention.

The following examples will illustrate the use of a preliminary sacrificial formation conditioning stage ahead of the fracturing fluid in high permeability formations in order to achieve tip screen out at the desired point in the pumping schedule.

EXAMPLE 1

For comparison, two fracturing operations were simulated for the same formation comprising sandstone having a permeability of 79 md. The first fracturing operation was initiated with three thousand gallons of a preliminary sacrificial conditioning stage in accordance with the invention comprising 30 lbs of a mixture of starch and mica per thousand gallons of fluid were suspended in a borate cross-linked guar fluid containing 20 lbs of guar per thousand gallons thousand gallons of fluid. This was followed by another 3200 gallons of pad and five ramped proppant stages containing 0, 2, 4, 8, 13 and 18 pounds of proppant per thousand gallons of fluid, respectively, suspended in a 30 lb per thousand gallons borate cross-linked gel. This treatment achieved a propped fracture half-length of 92 feet with tip screen out. A second treatment pumped with the same proppant ramping schedule but without the preliminary sacrificial conditioning stage of the invention and using only a 30 lb crosslinked guar gel screened out at 36 feet.

EXAMPLE 2

Simulations were run to show the results of using the preliminary sacrificial conditioning stage with a (low) estimated formation permeability, but which, in reality, included a zone having a much higher actual formation permeability, to determine the fracture length as compared with the same simulations run without the preliminary sacrificial conditioning stage. All pad and fraturing stages were performed with 25 lb per 1000 gallons borate-crosslinked guar gel. The preliminary sacrificial conditioning stage comprised 30 pounds of a mixture of starch and mica per 1000 gallons of a 20 pound per 1000 gallon borate-crosslinked guar gel fluid. In a design simulation assuming a formation permeability of 175–180 md, the fracture length was 38 feet when the preliminary sacrificial conditioning stage was employed as compared with 16 feet when no preliminary sacrificial conditioning stage was used. Considering the true formation parameters including a zone having an actual permeability of 490 md, the use of the preliminary sacrificial conditioning stage permitted a fracture length of 24 feet whereas immediate sand out caused there to be no development of fracture length whatsoever without the use of the preliminary sacrificial conditioning stage.

EXAMPLE 3

In a similar comparison as in Example 1, two fracturing operations were simulated for the same formation comprising sandstone having a permeability of 175 md. The first fracturing operation was initiated with 14,000 gallons of a preliminary sacrificial conditioning stage in accordance with the invention. Thus, 15 lbs of silica flour per thousand gallons of fluid were suspended in a proprietary micellar solution containing 3 gallons of a viscoelastic surfactant per thousand gallons of fluid. This was followed by five ramped proppant stages containing 0,1, 4, 7, 10, 13, 16 and 18 pounds of proppant per thousand gallons of fluid, respectively, suspended in micellar solution containing 5 gallons of the proprietary viscoelastic surfactant per thousand gallons of proprietary micellar fluid. This treatment achieved a propped fracture half-length of 72 feet with tip screen out. A second treatment pumped with the same proppant ramping schedule but without the preliminary sacrificial conditioning stage of the invention and using only the 5 gallon per thousand gallons of the same proprietary micellar fluid screened out at 47 feet propped half-length fracture.

It can be clearly seen that through the use of a preliminary sacrificial conditioning stage pumped prior to the normal fracturing fluid stages, longer fracture lengths are achieved than if only normal fluids are used. In high permeability formations, the use of the preliminary sacrificial conditioning stage of the present invention permits the development of longer fratures, even when the permeability of the formation would prohibit fracture formation without using a more concentrated, viscous and, thus, more damaging gel for the fracturing process.

While the invention has been illustrated in the more limited aspects of preferred embodiments thereof, other embodiments have been suggested and still others will occur to those skilled in the art upon a reading and understanding of the foregoing specification. It is intended that all such embodiments be included within the scope of this invention as limited only by the appended claims.

Having thus described our invention, we claim:

1. A method of fracturing a subterranean formation comprising providing a preliminary sacrificial conditioning stage solution comprising a suspension of a fluid loss additive;
    pumping the preliminary sacrificial conditioning stage solution into a subterranean formation at a pressure sufficient to fracture the formation and fracturing the formation and depositing fluid loss additive in the fracture formed;
    pumping a pad fluid into the fracture formed at a pressure sufficient to fracture the formation and extending said fracture;
    providing a carrier fluid with a proppant suspended therein, and pumping carrier fluid containing suspended proppant into the fracture.

2. The method of claim 1 in which fluid leak off into the formation occurs with the deposition of the fluid loss additive, and the carrier fluid containing suspended proppant pumped into the fracture is pumped at a pressure sufficient to fracture the formation and the fracture is extended and proppant is deposited in said formation.

3. The method of claim 1 in which the preliminary sacrificial conditioning stage solution comprises a low viscosity fluid, the formation fractured is a high permeability formation, and the fluid loss additive is selected from starch, mica, silica flour, organic resins, and mixtures thereof.

4. The method of claim 2 in which the preliminary sacrificial conditioning stage solution comprises a low viscosity fluid, the formation fractured is a high permeability formation, and the fluid loss additive is selected from starch, mica, silica flour, organic resins, and mixtures thereof.

5. The method of claim 1 in which the preliminary sacrificial conditioning stage solution comprises a suspension formed by combining components selected from starch, mica, silica flour, organic resins, and mixtures thereof, in a low viscosity fluid.

6. The method of claim 2 in which the preliminary sacrificial conditioning stage solution comprises a suspension formed by combining components selected from starch, mica, silica flour, organic resins, and mixtures thereof, in a low viscosity fluid.

7. The method of claim 1 in which the fluid loss additive comprises a mixture of starch and mica, the weight ratio of starch to mica being from about 11:1 to about 1:14.

8. The method of claim 1 in which the preliminary sacrificial conditioning stage solution comprises a suspension formed by combining starch and mica in a low viscosity fluid, the weight ratio of starch to mica being from about 11:1 to about 1:14.

9. The method of claim 2 in which the preliminary sacrificial conditioning stage solution comprises a suspension formed by combining starch and mica in a low viscosity fluid, the weight ratio of starch to mica being from about 11:1 to about 1:14.

10. The method of claim 1 in which the preliminary sacrificial conditioning stage solution comprises a finely divided inorganic solid or solids.

11. The method of claim 2 in which the preliminary sacrificial conditioning stage solution comprises a finely divided inorganic solid or solids.

12. The method of claim 7 in which the preliminary sacrificial conditioning stage solution further comprises a finely divided inorganic solid or solids.

13. The method of claim 8 in which the preliminary sacrificial conditioning stage solution further comprises a finely divided inorganic solid or solids.

14. The method of claim 9 in which the preliminary sacrificial conditioning stage solution further comprises a finely divided inorganic solid or solids.

15. A method of conditioning a fracture face of a subterranean formation comprising providing a preliminary sacrificial conditioning stage solution comprising a suspension of a fluid loss additive;
    pumping the preliminary sacrificial conditioning stage solution into a subterranean formation at a pressure sufficient to fracture the formation and fracturing the formation and depositing fluid loss additive in the fracture formed and conditioning a face of said fracture;
    pumping a pad fluid into the fracture formed at a pressure sufficient to fracture the formation and extending the fracture;
    providing a carrier fluid with proppant suspended therein, and pumping carrier fluid containing suspended proppant into the fracture.

16. The method of claim 15 in which fluid leak off into the formation occurs with the deposition of the fluid loss additive, and the carrier fluid containing suspended proppant pumped into the fracture is pumped at a pressure sufficient to fracture the formation and the fracture is extended and proppant is deposited in said formation.

17. The method of claim 15 in which the preliminary sacrificial conditioning stage solution comprises a low viscosity fluid, the formation fractured is a high permeability formation, and the fluid loss additive is selected from starch, mica, silica flour, organic resins, and mixtures thereof.

18. The method of claim 16 in which the preliminary sacrificial conditioning stage solution comprises a low viscosity fluid, the formation fractured is a high permeability formation, and the fluid loss additive is selected from starch, mica, silica flour, organic resins, and mixtures thereof.

19. The method of claim 16 in which the preliminary sacrificial conditioning stage solution comprises a suspension formed by combining components selected from starch, mica, silica flour, organic resins, and mixtures thereof, in a low viscosity fluid.

20. The method of claim 16 in which the fluid loss additive comprises a mixture of starch and mica, the weight ratio of starch to mica being from about 11:1 to about 1:14.

21. The method of claim 16 in which the preliminary sacrificial conditioning stage solution comprises a suspension formed by combining starch and mica in a low viscosity fluid, the weight ratio of starch to mica being from about 11:1 to about 1:14.

22. The method of claim 20 in which the preliminary sacrificial conditioning stage solution further comprises a finely divided inorganic solid or solids.

23. The method of claim 21 in which the preliminary sacrificial conditioning stage solution further comprises a finely divided inorganic solid or solids.

24. The method of claim 16 in which the conditioning produces an apparent low permeability.

25. The method of claim 21 in which the conditioning produces an apparent low permeability.

26. A method of fracturing a high permeability subterranean formation comprising providing a preliminary sacrificial conditioning stage solution comprising a suspension of a fluid loss additive in a low viscosity fluid; pumping the preliminary sacrificial conditioning stage solution into a high permeability subterranean formation at a pressure sufficient to fracture the formation and fracturing the formation and depositing fluid loss additive in the fracture formed, with leak off of fluid into the formation;

providing a carrier fluid with proppant suspended therein, and pumping carrier fluid containing suspended proppant into the formation at a pressure sufficient to fracture the formation and extending said fracture and depositing proppant in said formation.

27. The method of claim 26 in which the fluid loss additive is selected from starch, mica, silica flour, organic resins, and mixtures thereof.

28. The method of claim 26 in which the preliminary sacrificial conditioning stage solution comprises a suspension formed by combining components selected from starch, mica, silica flour, organic resins, and mixtures thereof, in a low viscosity fluid.

29. The method of claim 26 in which the fluid loss additive comprises a mixture of starch and mica, the weight ratio of starch to mica being from about 11:1 to about 1:14.

30. The method of claim 26 in which the preliminary sacrificial conditioning stage solution comprises a suspension formed by combining starch and mica in a low viscosity fluid, the weight ratio of starch to mica being from about 11:1 to about 1:14.

31. The method of claim 28 in which the preliminary sacrificial conditioning stage solution further comprises a finely divided inorganic solid or solids.

32. The method of claim 29 in which the preliminary sacrificial conditioning stage solution further comprises a finely divided inorganic solid or solids.

33. The method of claim 30 in which the preliminary sacrificial conditioning stage solution further comprises a finely divided inorganic solid or solids.

34. The method of claim 2 in which the preliminary sacrificial conditioning stage solution has a viscosity less than 150 centipoise at 510 $sec^{-1}$.

35. The method of claim 7 in which the preliminary sacrificial conditioning stage solution has a viscosity less than 150 centipoise at 510 $sec^{-1}$.

36. The method of claim 9 in which the preliminary sacrificial conditioning stage solution has a viscosity less than 150 centipoise at 510 $sec^{-1}$.

37. The method of claim 20 in which the preliminary sacrificial conditioning stage solution has a viscosity less than 150 centipoise at 510 $sec^{-1}$.

38. The method of claim 21 in which the preliminary sacrificial conditioning stage solution has a viscosity less than 150 centipoise at 510 $sec^{-1}$.

* * * * *